BENJAMIN B. LEWIS, OF BRISTOL, CONNECTICUT.

Letters Patent No. 87,346, dated March 2, 1869.

IMPROVED PREPARED COFFEE.

The Schedule referred to in these Letters Patent and making part of the same.

*To all whom it may concern:*

Be it known that I, BENJAMIN B. LEWIS, of Bristol, in the county of Hartford, and State of Connecticut, have invented a new and improved Preparation of Coffee; and I do hereby declare that the following is a full, clear, and exact description thereof, which will enable others skilled in the art to make and use the same.

My invention consists in preparing coffee and its substitutes for the market, with a dry and pulverized precipitant added thereto, for the purpose of producing a prepared coffee which will be self-settling.

The precipitant consists of any of the well-known albuminous or viscous matters, such as eggs and fish-skins, which are thoroughly dried and pulverized, and, when so pulverized, are thoroughly mixed with the ground coffee, both being in a dry state. Exact proportions for all the precipitants cannot be stated, as the precipitating-qualities vary in different articles.

I prepare codfish-skins, as a precipitant, by first cleansing the skins by washing in warm water, after which they are desiccated, dried, and pulverized. Nine ounces of this preparation, intimately mixed with one hundred pounds of roasted and ground coffee, are sufficient to make the coffee self-settling.

In preparing a decoction of coffee, it is sometimes rendered clear by percolation, sometimes by adding a precipitant to the decoction, and sometimes by macerating the ground coffee in a solution of albumen, all of which subject the consumer to needless expense and trouble, as the means for rendering the decoction clear may not always be at hand, and also to an uncertainty, as more of the precipitant, than is necessary to clarify the decoction, is liable to give it a foreign taste.

By my invention, I produce an article for a self-settling coffee at only a very trifling advance in cost. The trouble of adding a clarifying-agent each time a decoction of coffee is prepared, and the inconvenience of keeping such clarifying-agent separate, are entirely removed.

By preparing large quantities, by weight or measure, as described, the proper proportions can always be insured.

I do not claim the use of a precipitant in the preparation of a decoction of coffee; but

What I claim as new, and desire to secure by Letters Patent, is—

A new article of manufacture and commerce, consisting of a preparation of coffee or its substitutes, in combination with a pulverized precipitant, substantially as described, and for the purpose herein set forth.

BENJAMIN B. LEWIS.

Witnesses:
HENRY A. MITCHELL,
CHARLES S. LEWIS.